United States Patent [19]

Leiserson

[11] Patent Number: 5,192,904
[45] Date of Patent: Mar. 9, 1993

[54] RECHARGEABLE BATTERY CONVERSION KIT

[76] Inventor: Steven B. Leiserson, 10845 Wheatlands, Ste. C, Santee, Calif. 92071

[21] Appl. No.: 887,479

[22] Filed: May 22, 1992

Related U.S. Application Data

[63] Continuation-in-part of Ser. No. 793,122, Nov. 18, 1991.

[51] Int. Cl.⁵ .............................................. H01M 2/10
[52] U.S. Cl. ........................................ 320/2; 429/100
[58] Field of Search ................. 320/2; 429/96, 97, 98, 429/99, 100

[56] References Cited

U.S. PATENT DOCUMENTS

| | | | |
|---|---|---|---|
| 3,757,194 | 9/1973 | Weber et al. | 320/2 |
| 3,782,814 | 1/1974 | Greenblatt | 429/99 X |
| 3,883,789 | 5/1975 | Achenbach et al. | 320/2 |
| 4,065,710 | 12/1977 | Zytka | 320/2 |
| 4,315,364 | 2/1982 | Leffingwell | 320/2 X |
| 4,389,469 | 6/1983 | Nicholls | 429/98 |
| 4,563,627 | 1/1986 | Orban | 320/2 X |
| 4,853,302 | 8/1989 | Yamanaka et al. | 429/100 X |
| 5,015,546 | 5/1991 | Dulaney et al. | 429/99 |
| 5,038,093 | 8/1991 | Edwards et al. | 320/2 |
| 5,061,579 | 10/1991 | Ishimoto | 429/100 X |

FOREIGN PATENT DOCUMENTS 0084024 3/1990 Japan ........................... 320/2

Primary Examiner—Steven L. Stephan
Assistant Examiner—Kristine Peckman

[57] ABSTRACT

A rechargeable power kit designed to replace a set of alkaline batteries and the battery compartment cover of an electronic device comprises a set of NiCad rechargeable batteries and a cover assembly including an additional battery station to compensate for lower rated voltage of NiCad power cells, a recharging connector and associated current limiting circuit, and a flexible conductor with terminals specially adapted for insertion between the battery poles and the corresponding terminals of the compartment.

12 Claims, 3 Drawing Sheets

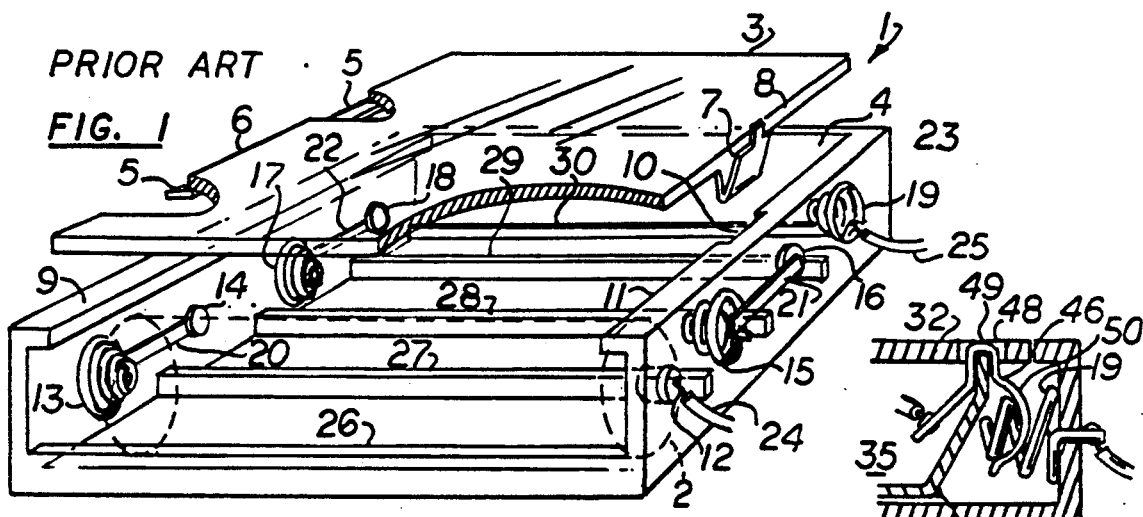
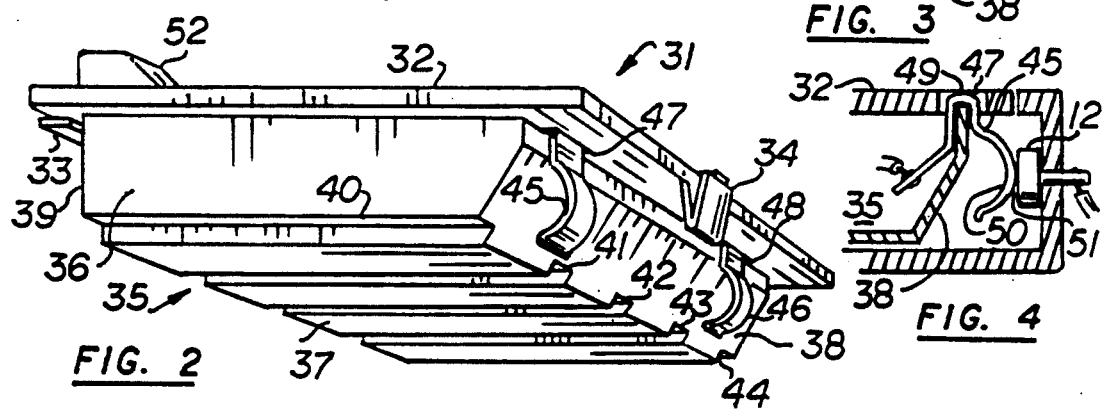
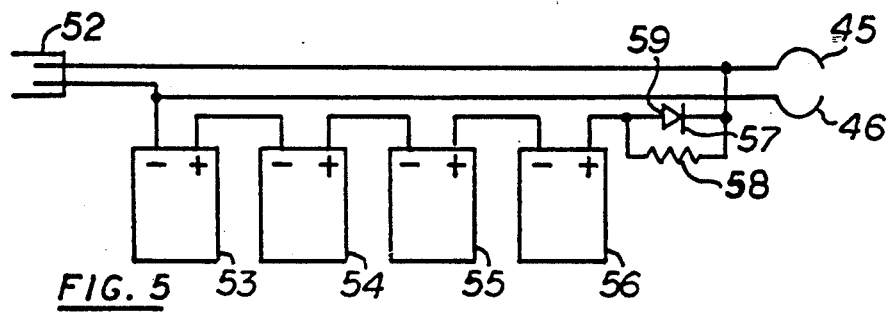
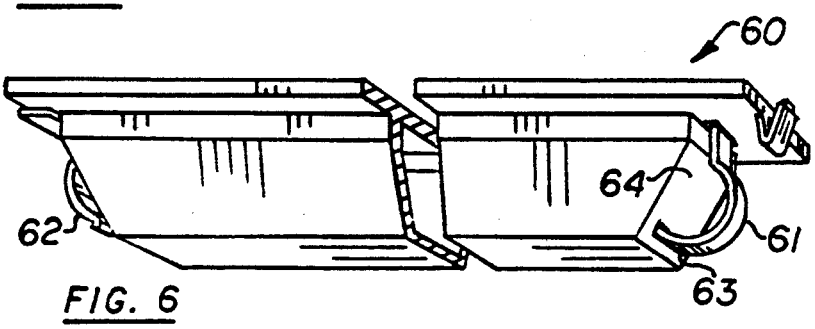

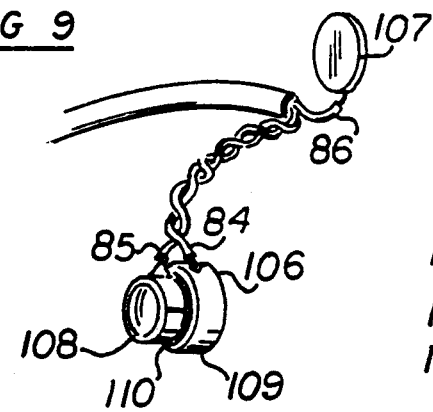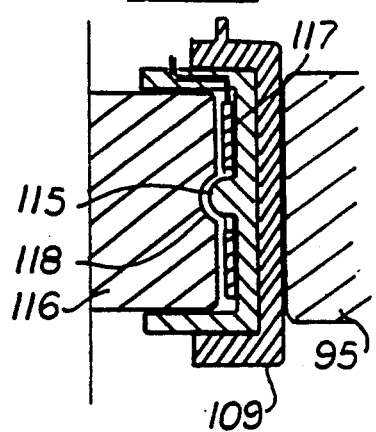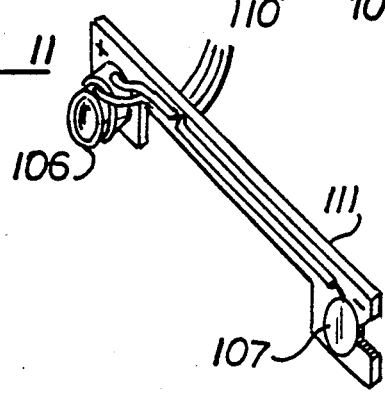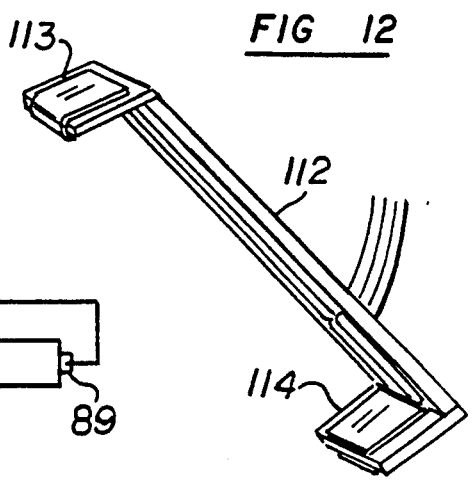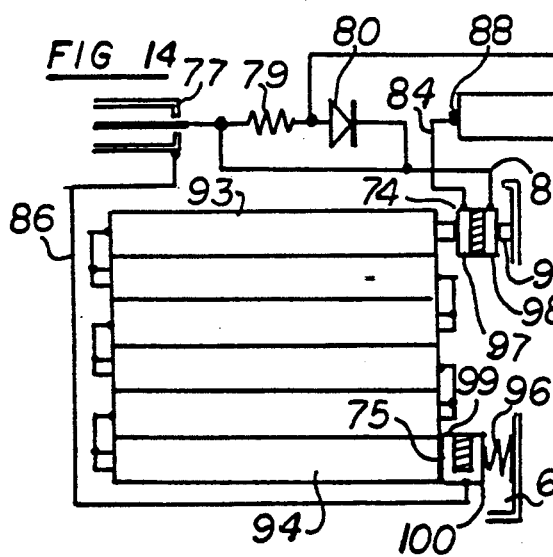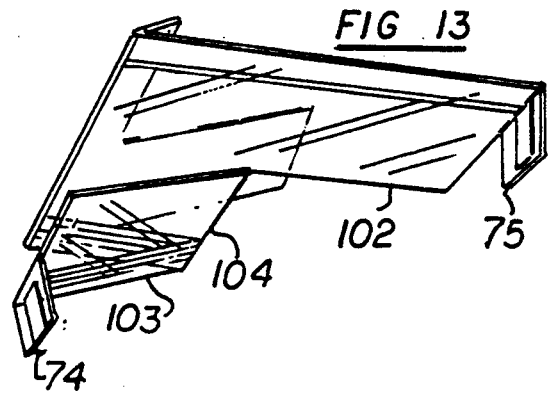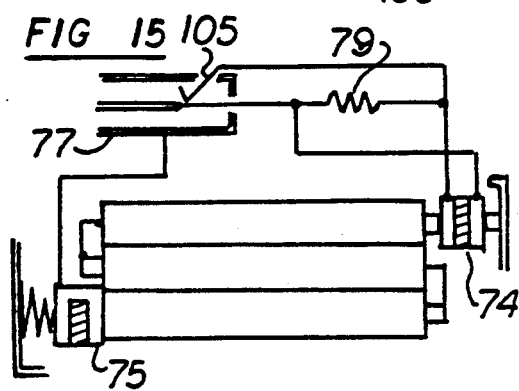

RECHARGEABLE BATTERY CONVERSION KIT

PRIOR APPLICATION

This is a continuation-in-part of copending application Ser. No. 07/793,122 filed Nov. 18, 1991.

FIELD OF THE INVENTION

This invention relates to rechargeable power packs for portable electrical devices.

BACKGROUND OF THE INVENTION

Many portable, battery-powered electronic devices such as radios, pagers, cassette recorders and the like have a covered battery compartment that is sized to accommodate several cylindrical batteries and to interconnect them in a parallel or a serial configuration. The sides of the compartment have spiral spring terminals designed to forcedly contact the negative, bottom poles of the batteries, and stationary plates to contact their positive top located poles. Batteries, whether rechargeable or not, must be inserted one by one between pairs of such terminals. Other electronic instruments with a higher power draw such as video recorders accept a power pack housing a plurality of rechargeable power cells. A recharged power pack may be conveniently substituted for a run-down one in a few seconds.

It would be advantageous to replace the set of batteries of the first-described type of instrument by a rechargeable power pack which would fit in the battery compartment. However, the presence of the various spiral spring terminals and the battery-separating ribs that usually line the bottom of the battery compartment interfere with the insertion of such power packs.

It would be even more advantageous to replace either the non-rechargeable batteries or the rechargeable power pack of an electronic device with a kit comprising rechargeable cells and a circuit allowing recharging during or after operation of the device.

One of the problems encountered in making substitution of non-rechargeable power cells with a like number of rechargeable ones is the lesser rating voltage of the latter which may result in unacceptable power supply voltage levels.

SUMMARY OF THE INVENTION

The principal and secondary object of the invention is to provide a replacement for a set of batteries normally required to energize a portable electrical device by a single, rechargeable power pack or set of rechargeable batteries that fit within the battery compartment and provides reliable contact with positive and negative terminals originally designed for contact with the various batteries positive and negative poles.

This and other valuable objects are achieved in a first approach, by means of a power pack shaped and dimensioned to be inserted in the battery compartment of an electrical device. The top of the power pack is exactly symmetrical with the battery compartment cover which it replaces. The power pack has a pair of flexible terminal prongs that are specially designed to provide a good contact with both the spiral spring-type negative terminal or the positive stationary terminal between which cylindrical batteries are normally inserted. In a second approach, rechargeable substitute batteries are provided with a substitute battery compartment cover that include an additional battery station and an in-line recharging circuitry.

BRIEF DESCRIPTION OF THE DRAWING

FIG. 1 is a perspective view of a battery compartment of the prior art;

FIG. 2 is a perspective view of a rechargeable power pack according to the invention;

FIG. 3 is a detail view illustrating contact with a spiral-spring, negative battery terminal;

FIG. 4 is a detail view illustrating contact with a stationary, positive battery terminal;

FIG. 5 is an electrical diagram of the power pack;

FIG. 6 is a perspective view of an alternate embodiment of the invention.

FIG. 9 is a perspective view of a first alternate conductor assembly;

FIG. 10 is a cross-sectional view of a customized contact assembly;

FIG. 11 is a perspective view of a second alternate conductor assembly;

FIG. 12 is a perspective view of a third alternate conductor assembly;

FIG. 13 is a perspective view of a modified flexible strip;

FIG. 14 is a schematic of a first embodiment of the battery kit: and

FIG. 15 is a schematic of a second embodiment thereof.

DESCRIPTION OF THE PREFERRED EMBODIMENTS OF THE INVENTION

Figure 7:
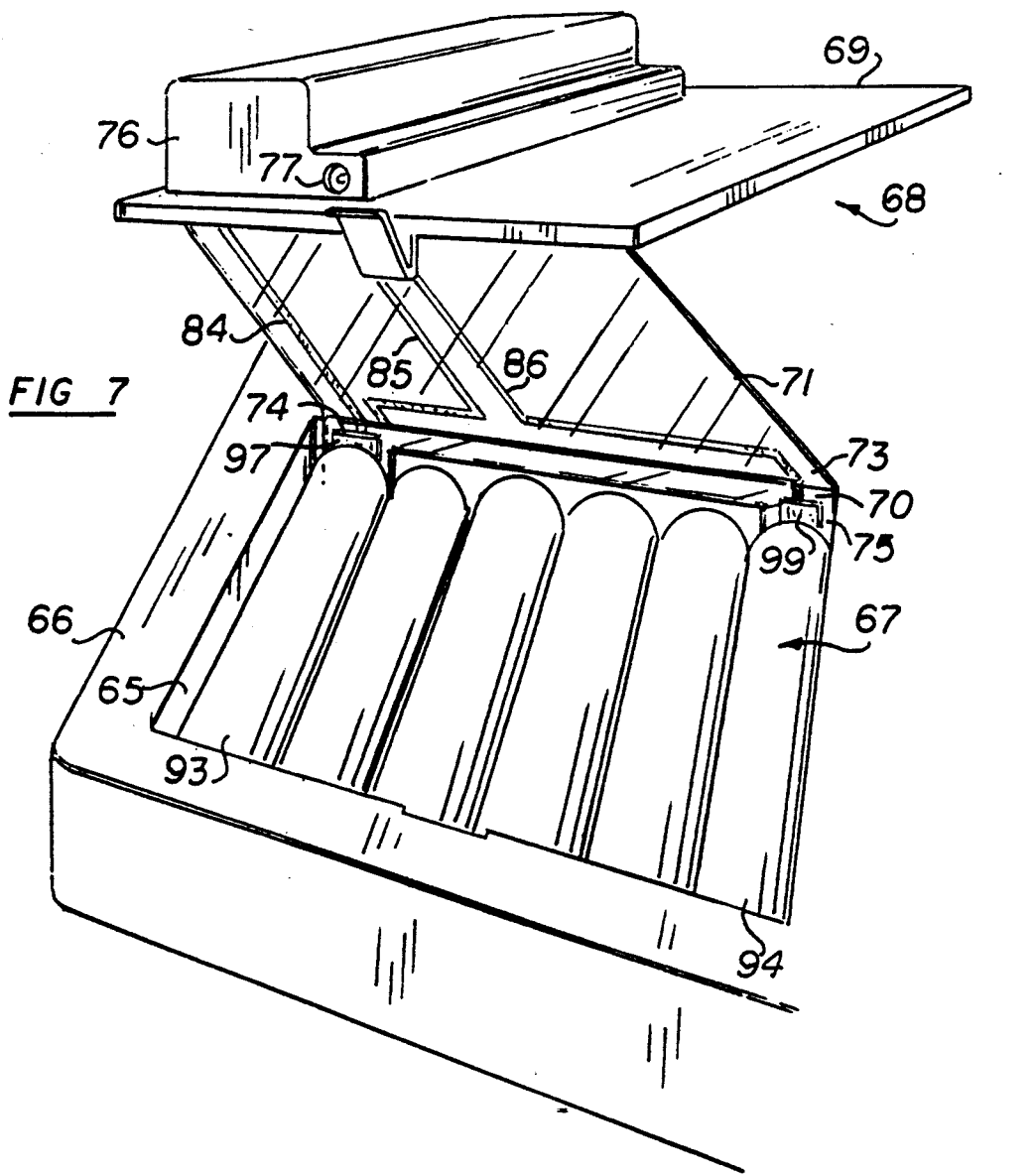
FIG. 7 is a perspective view of a rechargeable battery kit.

Referring now to the drawing, there is illustrated in FIG. 1 the battery holding compartment 1 of an electrical device such as a portable radio, cassette recorder, video game unit or the like. The compartment, shown made of transparent material for the sake of clarity, is designed to hold four AA sized batteries wired in series. Only the first battery 2 is illustrated in phantom lines. A removable cover 3 closes the access 4 to the battery compartment, and is secured by a flange 5 along a section of the lower back edge 6 of the cover and a detent clip 7 mounted along front edge 8. The flange 5 bears against the underside of a ledge 9 formed in the rear rim section of the compartment 1. The detent strip 7 passes through a notch 10 in a front ledge section 11 of the compartment, then under that ledge. Each battery is inserted between two terminals 12, 13, 14, 15, 16, 17, and 18, 19. The positive poles at the top of the batteries are placed against stationary positive terminals 12, 14, 16, and 18. The negative pole forming the bottom of the batteries are pressed against spiral springs 13, 15, 17, and 19 forming the negative terminals. Straps 20, 21 and 22 between terminals 13 and 14, 15, and 16, and 17 and 18 combine the batteries into a series arrangement. The positive terminal 12 and the negative terminal 19 pass through the front wall 23 of the compartment and are connected by appropriate wiring 24, 25 to the electrical device circuits. The batteries are separated and cradled by parallel ribs 26–30 formed into the bottom of the compartment.

FIG. 2 illustrates a rechargeable power pack 31, according to the invention, that may be substituted for the four batteries and cover 3 into the compartment 1 of FIG. 1. The power pack has a flat top 32 which is exactly symmetrical to the cover 3. It also includes a rear flange 33 and a front detent clip 34 to secure the power pack 31 into the compartment 1. A tray 35 containing a group of rechargeable power cells is welded to the bottom of the cover 32. The tray comprises a peripheral wall 36 and a bottom piece 37. The front section 38 and back section 39 of the peripheral walls are spaced apart from the inner front and back walls of the compartment 1 in order to provide clearance for the spiral-spring terminals 13, 15, 17, and 19. Slots 40–44 in the bottom piece 37 are shaped and positioned to engage the ribs 26–30 in the bottom of the compartment 1 so that the tray 35 occupies the entire depth of the compartment. The median and lower portion of the front section 38 of the peripheral wall is slanted downwardly and inwardly in order to provide additional clearance for the spiral-spring terminals.

Connection between the power pack 31 and the positive and negative terminals 12 and 19 of the compartment are provided by a pair of resiliently flexible prongs 45 and 46 that extend in front of the front section 38 of the peripheral wall. The prongs 45, 46 are identical and are configured to provide a good wiping contact with either the stationary-type terminal 12 or the compressible spiral-spring terminal 19 as illustrated in FIGS. 3 and 4. Each prong is formed from a small strip of copper that begins inside the tray where it is connected to the network of power cells. A hairpin-shaped portion 49 of the strip passes over the top rim of the front wall 38 through one of a pair of slots 47, 48 in the flat top 32. After running shortly downward along the upper outer surface of the front wall 38 it bows away from the front wall section 38 to form a semi-circular arcuate portion 50. When the power pack 31 is inserted into the compartment 1, the negative prong 46 slips between spiral coils of the negative spring terminal 19, providing a good contact with a terminal after a wiping movement which clears the contacting areas of any oxide or other deposit. The arcuate portion 50 of the other prong 45 comes in contact with the positive stationary terminal 12, and is deflected slightly until its apex 51 bears firmly against the positive terminal 12. The movement of the prong against the terminal also provides a good wiping movement of the contacting surfaces.

The pair of slots 47, 48 in the flat top provide access to the electrical output of the power pack for use in powering accessories or in wiring auxiliary external power packs in parallel with the one placed in the battery compartment. A recharging connector 52 is also mounted on the flat top.

The set of four rechargeable power cells 53–56 inside the tray 35 are wired in series as illustrated in FIG. 5. A diode 57 and resistor 58 wired in parallel connect the positive output of the series of power cells to the positive terminals of the charging connector 52 and the positive prong terminal 45. Since the anode 59 of the diode 57 is connected to the positive output of the power cells any charging current must pass through the current limiting resistor 58. Any current drawn from the power cells flows directly though the diode 57.

In the case where the original batteries are not laid side-by-side but on end in a battery compartment of an electrical device, the power pack according to the invention must have the general configuration 60 illustrated in FIG. 6. The two contacting prongs 61, 62 are located at opposite ends of the power pack.

One of those prongs 61 has a distal end 63 that curves inwardly to penetrate a lower section of the side wall 64 where it remains embedded for better stability. Due to the inwardly and downwardly orientation of the side wall 64, this type of prong provides effective contact with either types of terminals.

The universal configuration of the power pack terminal prongs, not only will be compatible with the spiral-spring type or stationary type terminals illustrated in this example, but also with a variety of resilient and non-resilient, slotted or integral terminals which may be found in a variety of battery compartments.

Figure 8:
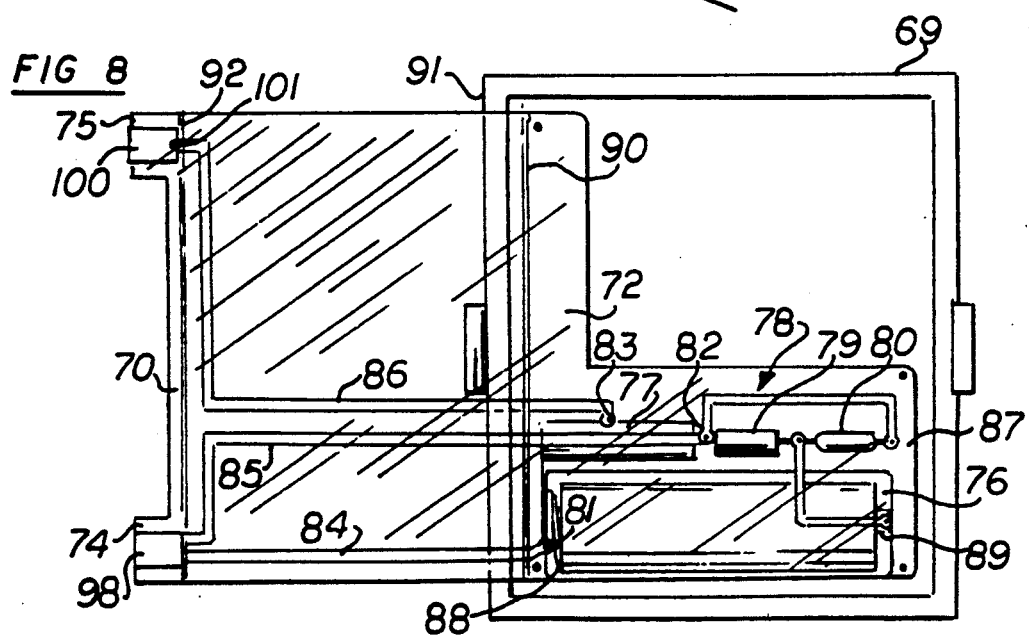
FIG. 8 is a bottom plan view of the battery compartment cover assembly.

FIGS. 7–15 illustrate an alternate approach to the power pack consisting essentially in the replacement of the non-rechargeable batteries in the battery compartment 65 of an electrical device 66 by a set 67 of similarly sized rechargeable batteries, and replacement of the original battery compartment cover by an assembly 68 specially configured to allow recharging of the battery set 67 either during or after operation of the device 66.

The assembly 68 comprises a substantially planar support 69 that is shaped and dimensioned to mimic the original battery compartment cover of the device and effectively close the opening 70 of that compartment in place of the original cover. As more specifically illustrated in FIGS. 7 and 8, the planar support is connected to the battery compartment and the batteries by a detachable flexible strip 71 which at a first end 72 is permanently attached to the underside of the planar support 69, and includes at its distal end 73 two tips 74, 75 that are shaped and dimensioned to be inserted between the poles of two batteries and their corresponding terminals in the walls of the compartment 65.

In order to compensate for the lower voltage rating, typically 1.2 volt, of NiCad batteries compared to the voltage rating, typically 1.5 volt, of an alkaline battery, an additional battery station 76 is provided in the upper surface of the planar support 69. A socket 77 also mounted on the upper surface of the planar support is designed to receive a jack connector of a recharging current source. An electrical circuit 78 including a charging current limiting resistor 79 and a by-pass diode 80 interconnects the socket 77 and the additional battery station 76 to three connection points 81, 82 and 83 on the proximal end section 72 of the flexible strip 71.

In this embodiment, the flexible strip 72 is made from a laminated sheet of insulating material, as is commonly used in the fabrication of flexible cables, upon which three electrical conductors 84, 85, and 86 have been printed according to well-known techniques. A part 87 of the proximal end section of the flexible strip is also used to mount the electrical circuit 78 and carry appropriate wiring conductors between the additional battery station terminals 88, 89, the socket 77, the resistor 79, and the diode 80. The flexible strip 72 is hinged along a first fold line 90 parallel and proximal to the front edge 91 of the planar support 69. The distal end is also folded along a second fold line 92 so that when the contacting tips 74 and 75 are inserted between the poles and corresponding terminals of the two end batteries 93, 94 of the set 67, the assembly assumes the Z-shaped configuration illustrated in FIG. 7. This particular arrangement allows for easy and convenient insertion of the contacting tips 74, 75 and closure and reopening of the battery compartment 65. As more specifically shown in the diagram of FIG. 14, the first tip 74 which contacts the positive pole of battery 93 and the positive terminal 95 of the compartment has a first pole-contacting area 97 that is connected to conductor 84 on one side of the tip 74 and a first terminal contacting area 98 connected to conductor 85 on the opposite face of the tip 74. The first pole-contacting area 97 and the first terminal-contacting area 98 are insulated by the thickness of the tip 74. By contrast, the second pole-contacting area 99 on one side of the second tip 75 and the second terminal-contacting area 100 on the opposite side of that tip are both connected to conductor 86 by means of a feed-through 101, (FIG. 8) or other appropriate technique.

In the event that the compartment 65 houses an odd number of batteries, the two tips must be positioned on opposite sides of the compartment. This is achieved by separating the distal halves 102, 103 of the flexible strip, and folding one half 103 along a third fold line 104 as illustrated in FIG. 13.

When a limited number of batteries are reused by the device, the additional battery station 76 of FIG. 1 may be omitted since the voltage difference between the rechargeable type and non-rechargeable type of batteries may be insignificant. FIG. 15 illustrates the wiring of such a simplified assembly where only three batteries are used, necessitating placement of the tips at opposite sides of the battery compartment. In the embodiment illustrated by the schematic of FIG. 14, the diode 80 is used to by-pass the current limiting resistor 79 when the current necessary to operate the device is drawn from the rechargeable batteries. The schematic of FIG. 15 illustrates an alternate arrangement wherein the socket 77 incorporates a switch 105 that acts in lieu of the diode 80 of the alternate embodiment to short-circuit the resistor 79 when the operating current is drawn directly from the battery set and not from the remote charging source. The switch 105 is opened when the recharge current source jack is inserted into the socket, thus placing the resistor 79 in the recharging current path to the batteries.

Illustrated in FIGS. 9, 11 and 12 are alternate embodiments of the flexible connection between the substitute battery compartment cover and the battery poles and terminals, using separate wires and cables instead of a printed flexible strip. In the embodiment of FIG. 9, the contacting tips 74, 75 of the previously described embodiments are replaced by a cap 106 and a disc 107. The cap 106 is shaped and dimensioned to fit over the positive poles of the batteries. The disc 107 is designed to lie against the negative pole of the batteries. The caps have an internal, battery pole-contacting element 108 which is separated from the surrounding terminal-contacting element 109 by an insulator 110. In the embodiment illustrated in FIG. 11, the cap and disc are separated and positioned by a small strip 111 of insulating rigid material which facilitates the selection of the battery connections and their positioning into the battery compartment.

In the embodiment of FIG. 12, pole-contacting areas and terminal-contacting areas are printed on a substrate 112 in a manner similar to the technique used on the flexible strip of the previously described embodiment of the invention. In this embodiment, the tips 112 and 113 are positioned for insertion in opposite sides of the compartment housing an odd number of rechargeable batteries.

In order to prevent use of the battery-recharging assembly according to this invention with non-rechargeable batteries, the positive pole-contacting area of a cap or tip may be provided with an insulated nib 115 which projects from the center of the pole-contacting area and thus prevent contact between the battery pole 116 and its contacting area 117 unless the positive pole of the battery has a cavity 118 positioned to engage the nib 115. Such a cavity would be provided exclusively on rechargeable batteries. In such a case, the specially configured batteries and the recharging assembly would be provided as a complete replacement kit for the rechargeable batteries.

While the preferred embodiments of the invention have been described, modifications can be made and other embodiments may be devised without departing from the spirit of the invention and the scope of the appended claims.

What is claimed is:

1. The combination of an electrical device having a compartment shaped and dimensioned to hold at least a first battery having a positive pole and a negative pole, said compartment having an opening sized to allow loading and unloading said first battery, positive and negative terminals protruding from lateral sections of said compartment, said terminals being positioned to contact said poles and wired to carry electrical currents form said poles to electrical circuits in said device, and a removable cover shaped and dimensioned to close said opening, a rechargeable power supply assembly which comprises:

a support member;

a current conducting means secured at a first end to said support and having first and second tips at an opposite end, each tip being shaped and dimensioned for insertion between one of said poles and one of said terminals, each of said tips having a terminal-contact area on a side and a pole-contacting area on an opposite side; and an electrical circuit on said support member for feeding current from a remote current source to said poles and terminals via said current conducting means.

2. The assembly of claim 1, wherein said current conducting means includes:

three separate connections at said first end;

a first conductor joining a first of said connections to the first tip and being in electrical contact with a first pole-contacting area on one side of said first tip and with a first terminal-contact area on an opposite side of said first tip;

a second conductor joining a second of said connections to the second tip and being in electrical contact with a second pole-contacting area on one side of said second tip; and a third conductor joining a third of said connections to the second tip and being in electrical contact with a second terminal-contact area of an opposite side of said second tip, said second pole-contacting area of said second tip being electrically insulated from said second terminal-contacting area.

3. The assembly of claim 2, wherein said support member comprises a substantially planar support shaped and dimensioned to close said opening in place of said removable cover.

4. The assembly of claim 3, wherein said support comprises means for mounting an additional battery in series with said first battery.

5. The assembly of claim 2, wherein said current conducting means comprises a strip of non-conductive material having said conductors printed thereupon.

6. The assembly of claim 5, wherein said strip has a proximal end section secured to said cover and said connection mounted on said proximal end section, and a bifurcated distal end section having a first leg terminated by said first tip and a second leg terminated by said second tip.

7. The assembly of claim 6, wherein said second leg is folded away from said first leg, whereby said first and second tips are positioned to contact terminals at opposite sides of said compartment.

8. The assembly of claim 2, wherein said electrical circuit means, comprises a current limiting resistor wired in series with said battery.

9. The assembly of claim 8, wherein said electrical circuit means further comprises a diode wired in parallel with said resistor and oriented to allow unlimited current flow between said battery and said terminals.

10. The assembly of claim 8, for use exclusively in connection with rechargeable batteries comprising a positive pole contact surface having a central cavity and for inhibiting contact with terminals of other batteries lacking said cavity, wherein at least one of said tips comprises an insulated nib extending from a pole-contacting area, said nib being shaped and dimensioned to engage into said cavity.

11. The assembly of claim 3, wherein said support member comprises a bi-polar socket for receiving a mating connector wired to said remote current source.

12. The assembly of claim 5, wherein said current conducting means is made from a flexible web-like material.

* * * * *